June 19, 1956   D. H. HARTIG   2,750,702
FISH LURE
Filed Oct. 18, 1954
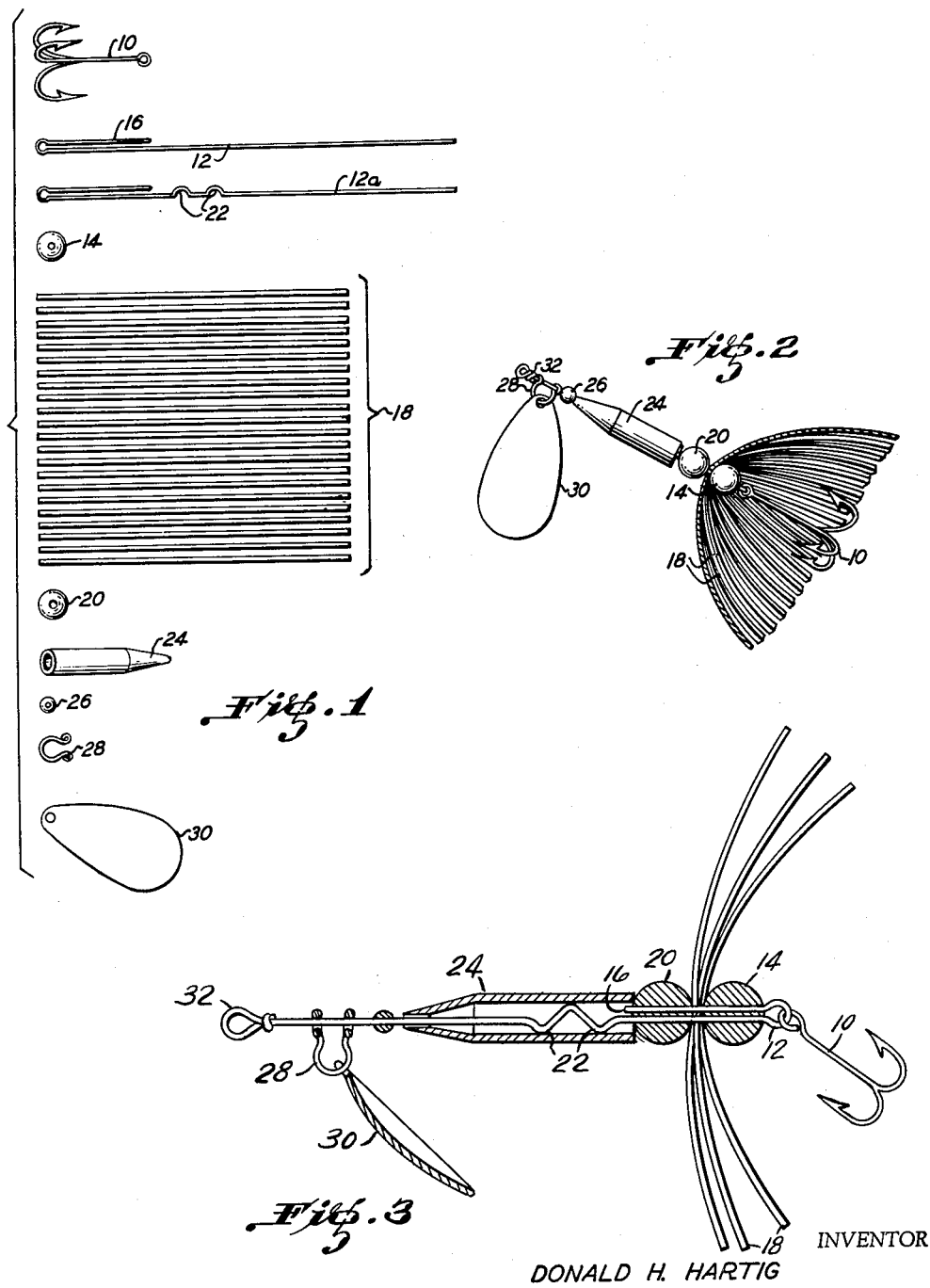
INVENTOR
DONALD H. HARTIG
BY Parker and Walsh
ATTORNEY

United States Patent Office 2,750,702
Patented June 19, 1956

2,750,702
FISH LURE

Donald H. Hartig, Osceola, Ind.

Application October 18, 1954, Serial No. 462,731

5 Claims. (Cl. 43—42.17)

This invention relates to a fishing lure.

It is not suggested that the fishing lure of this invention resembles any particular bait material commonly found in nature but it has been found that the device of this invention is relatively easy and inexpensive of construction and it has been observed to have excellent fish-attracting qualities.

The device of this invention can best be understood by reference to the accompanying drawings showing an embodiment of the invention.

In the drawing:

Figure 1 is a exploded view illustrating the individual parts of the invention before assembly thereof and including one partially completed part, as will further appear, Figure 2 is an elevation of the assembled lure, partly in section, Figure 3 is a longitudinal view of the device, largely in section.

I first take a hook 10 and place it in the bight of a suitably bent wire 12 as shown in Figure 1. Although the hook shown is of the multiple pointed type, a single pointed hook may be substituted if desired. I have found that twenty-six gage wire is easy to fabricate in the form desired and it is sufficiently heavy for ordinary use.

There is next strung on the wire a bead 14 approximately 8 mm. in diameter. Next, there is inserted between the short end 16 of the wire 12 and the main portion thereof from 15 to 25 strands of fine rubber 18. This material is preferably approximately square in cross-section, about one-fortieth inch wide and three or four inches long. The outer end 16 of the short arm of the wire is compressed to allow bead 20 to be slipped over both arms of the wire after it has been initially strung on wire 12, thus confining the strands 18 between the two arms 12 and 16 of the wire and the two beads 14 and 20. After the bead 20 is pushed well down, one or more humps 22 are placed in wire 12 as shown at 12a in order to confine the bead 20 in position.

A thimble 24 is then slipped over the humps 22 and a smaller bead 26 is strung on the wire. A spinner or spoon 30 is placed in the bight of clevis 28 and the clevis added to the wire.

The lure is completed by forming a loop in the outer end of the wire which may simply be a closed loop or preferably may be formed by wrapping one or more turns of the wire about itself as shown at 32.

It is desired to have the rubber strands under sufficient compression to hold them tightly spread out over the hook 10. In this state of partial compression they tend to spread out and form a skirt around the hook as shown in Figure 2.

As is common in fishing lures, it is preferred to have the exposed metallic portions of the lure of shiny material as it appears that lures that are so made are more attractive to fish.

It will thus be seen that I have provided a simple, economical, easily assembled device which in practice has been found very useful for the purpose intended.

What I claim and desire to protect by United States Letters Patent is as follows.

I claim:

1. In a fishing lure, a wire having the outer portion thereof bent back on itself to form a loop, a long spine portion and a short arm portion in parallel relation, a hook with the eye thereof caught in the loop, means, slidably mounted on the parallel arm and spine above the loop, a bundle of flexible rubber strands of sufficient length to overlay the hook, caught between the arm and the spine, next above the slidable means, additional slidable means mounted on the arm and spine above the strands, the two slidable means being urged toward each other to partially compress said strands so that at least a portion of them are caused to stand out in skirt fashion, an elongated collar next above the additional sliding means and covering the terminal portion of the arm, a spoon mounted for swivel movement above the collar and a loop in the end of the spine above the spoon mounting for attaching the lure to a line.

2. A lure as set forth in claim 1 wherein beads are used for the slidable means.

3. A lure as in claim 1 wherein the slidable means are urged toward each other by an enlargement of the spine above the additional slidable means, said enlargement cooperating with the loop on the outer end of the spine.

4. A lure as in claim 3 wherein the enlargement in the spine is made by bending the wire on itself.

5. A lure as in claim 4 wherein beads are used for the slidable means.

References Cited in the file of this patent

UNITED STATES PATENTS

| 336,746 | Reisor | Feb. 23, 1886 |
| 1,353,779 | Moore | Sept. 21, 1920 |
| 1,901,842 | Firton | Mar. 14, 1933 |
| 2,036,954 | Murray | Apr. 7, 1936 |
| 2,268,541 | Arbogast | Jan. 6, 1942 |
| 2,612,717 | Kuehnel | Oct. 7, 1952 |

FOREIGN PATENTS

| 53,719 | France | Mar. 25, 1946 |